US012782706B2

(12) United States Patent
Fahlbusch et al.

(10) Patent No.: US 12,782,706 B2
(45) Date of Patent: Nov. 3, 2026

(54) APPARATUS FOR FASTENING AN OBJECTIVE

(71) Applicant: Carl Zeiss Microscopy GmbH, Jena (DE)

(72) Inventors: Ingo Fahlbusch, Goettingen (DE); Johannes Knoblich, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 325 days.

(21) Appl. No.: 18/606,503

(22) Filed: Mar. 15, 2024

(65) Prior Publication Data

US 2024/0329380 A1 Oct. 3, 2024

(30) Foreign Application Priority Data

Mar. 29, 2023 (DE) ......................... 102023108049.0

(51) Int. Cl.
*G02B 21/14* (2006.01)
*G02B 7/02* (2021.01)
*G02B 21/24* (2006.01)
*G02B 21/02* (2006.01)

(52) U.S. Cl.
CPC ........... *G02B 21/248* (2013.01); *G02B 7/022* (2013.01); *G02B 7/026* (2013.01); *G02B 21/02* (2013.01)

(58) Field of Classification Search
CPC ...... G02B 21/00; G02B 21/24; G02B 21/248; G02B 7/022; G02B 7/026; G02B 21/02
USPC .................................................. 359/368, 377
See application file for complete search history.

(56) References Cited

U.S. PATENT DOCUMENTS

| | | | | |
|---|---|---|---|---|
| 4,515,439 | A | 5/1985 | Esswein | |
| 9,383,567 | B2 * | 7/2016 | Ue | G02B 21/06 |
| 2004/0085629 | A1 | 5/2004 | Zimmermann et al. | |
| 2004/0263961 | A1 | 12/2004 | Hummel | |
| 2006/0275918 | A1 | 12/2006 | Harada et al. | |
| 2007/0047093 | A1 | 3/2007 | Hoering et al. | |
| 2007/0291360 | A1 | 12/2007 | Pirsch | |
| 2010/0027109 | A1 | 2/2010 | Liebel et al. | |
| 2012/0324608 | A1 * | 12/2012 | Rychen | B82Y 35/00 850/53 |

(Continued)

FOREIGN PATENT DOCUMENTS

| | | | |
|---|---|---|---|
| DE | 3202461 | C1 | 6/1983 |
| DE | 10123027 | A | 11/2002 |

(Continued)

*Primary Examiner* — William R Alexander
(74) *Attorney, Agent, or Firm* — Bradley J. Thorson; DeWitt LLP

(57) ABSTRACT

An apparatus for attaching an objective to an objective mount of a microscope and for providing a connection for an electrical add-on module for the objective, thereby enabling a more versatile use of the add-on module, with fewer or no restrictions on possible combinations of add-on module and objective. The apparatus includes an adapter ring with an eye to which the objective can be fastened and which can be fastened to the objective mount. The adapter ring has a ring axis, a ring face facing the objective, electrical adapter contacts for connection to electrical mount contacts of the objective mount, contact elements arranged on a ring edge for electrical connection to the add-on module, and a module holder for the add-on module.

13 Claims, 16 Drawing Sheets

(56) References Cited

U.S. PATENT DOCUMENTS

| | | | | |
|---|---|---|---|---|
| 2013/0010367 | A1* | 1/2013 | Schek | G02B 27/0068 359/656 |
| 2013/0027768 | A1* | 1/2013 | Fahlbusch | G02B 7/14 359/368 |
| 2014/0313603 | A1* | 10/2014 | Fahlbusch | G02B 7/10 359/823 |
| 2015/0015943 | A1 | 1/2015 | Scheps et al. | |
| 2015/0022882 | A1* | 1/2015 | Ue | G02B 21/06 359/385 |
| 2018/0314048 | A1 | 11/2018 | Scheps et al. | |
| 2019/0324255 | A1* | 10/2019 | Pergande | G02B 21/248 |
| 2021/0011267 | A1* | 1/2021 | Fahlbusch | G02B 7/14 |
| 2021/0149173 | A1 | 5/2021 | Knoblich et al. | |
| 2021/0341722 | A1 | 11/2021 | Knoblich et al. | |
| 2021/0341723 | A1 | 11/2021 | Knoblich et al. | |

FOREIGN PATENT DOCUMENTS

| | | | |
|---|---|---|---|
| DE | 10251379 | A1 | 5/2004 |
| DE | 10333326 | A1 | 3/2005 |
| DE | 102005040828 | A1 | 3/2007 |
| DE | 102010001604 | A1 | 8/2011 |
| DE | 102013006997 | A1 | 10/2014 |
| DE | 102013011544 | A1 | 1/2015 |
| DE | 102017208615 | A1 | 11/2018 |
| DE | 102018205897 | A1 | 10/2019 |
| DE | 102019218705 | A1 | 6/2021 |
| DE | 102020111715 | A1 | 11/2021 |
| DE | 102020111716 | A1 | 11/2021 |
| EP | 1717628 | A1 | 11/2006 |
| WO | 2008/028475 | A2 | 3/2008 |
| WO | 2019/016048 | A1 | 1/2019 |

* cited by examiner

APPARATUS FOR FASTENING AN OBJECTIVE

RELATED APPLICATION

The present application claims the benefit of German Application No. 102023108049.0, filed Mar. 29, 2023, said application being hereby incorporated herein in its entirety by reference.

TECHNICAL FIELD

The invention relates to an apparatus for fastening an objective to an objective mount of a microscope and for providing a connection for an electrical add-on module for the objective, the apparatus comprising an adapter ring comprising an eye to which the objective can be fastened and which can be fastened to the objective mount, the adapter ring comprising a ring axis, a ring face facing the objective and further comprising electrical adapter contacts for connection to electrical mount contacts of the objective mount and contact elements arranged on a ring edge for electrical connection to the add-on module, and a module holder for the add-on module.

BACKGROUND

Such an apparatus for fastening an objective is known from DE 10 2020 111 716 A1. Further apparatus for attaching an objective can be found in DE 10 2010 001 604 A1, DE 10 2013 006 997 A1, DE 3 202 461 C1, DE 10 251 379 A1, DE 10 2019 218 705 A1, WO 2011/095 609 A1 and DE 10 2017 208 615 A1.

Immersion objectives are used in light microscopy to increase optical resolution. An immersion objective is an objective whose front lens is immersed in an immersion medium, which is usually liquid, during operation. In an upright microscope, the immersion medium is applied to a cover glass, under which the sample to be examined is located. In an inverted microscope, the image is taken through the sample carrier from below. The immersion medium is then located on the sample carrier.

DE 10 2020 111 716 A1 discloses an immersion retrofit kit that can be attached to the cover of an objective and supplies the objective with immersion medium at the front lens. The objective is fastened to a microscope mount via a bayonet adapter ring, whereby electrical contacts are established between the bayonet adapter ring and the microscope mount. The immersion retrofit set is electrically controllable and is therefore electrically connected to the microscope. DE 10 2020 111 716 A1 provides two variants for this. In both variants, contact is made to contacts that are configured on a flattened part of the bayonet adapter ring and are looped through to the microscope holder. In a first variant, which is shown in FIG. 14 of DE 10 2020 111 716 A1, the objective comprises electrical plugs on its outer surface, to which the immersion retrofit set is plugged in and which are connected to the contacts on the bayonet adapter ring via cables running through the objective. The objective comprises matching mating contacts on its underside. In a second variant, which is shown in FIG. 9 of DE 10 2020 111 716 A1, the immersion retrofit set is fastened to the jacket of the objective by means of a screw connection, e.g. a clamp, and itself makes contact with the contacts on the bayonet adapter ring via mating contacts provided on its underside.

DE 10 2020 111 716 A1 very advantageously achieves that a reliable and electrically controlled application of the immersion agent is possible. However, there are restrictions with regard to the possible combinations of immersion retrofit set and objective. Either the objective must already provide the mating contacts, the connector and the lines from the connector to the mating contacts and thus be configured for a specific immersion retrofit set (variant 1). Or the dimensions of the objective and the immersion retrofit set are matched to each other, especially with regard to the diameter of the lens jacket, so that the mating contacts at the bottom of the immersion retrofit set lie exactly on the contacts on the bayonet adapter ring (variant 2). In both cases, care must also be taken to ensure the correct rotational orientation, either of the objective in the bayonet adapter ring (variant 1) or of the immersion retrofit set on the objective (variant 2), so that the contacts and the mating contacts are correctly connected to each other.

SUMMARY OF THE DISCLOSURE

Based on this, the invention is based on the objective of enabling a more versatile use of an add-on module, e.g. an immersion retrofit solution—with fewer or no restrictions with regard to the possible combinations of add-on module and objective. Furthermore, the objective is to create the greatest possible freedom with regard to the add-on modules and to eliminate the need for tedious and error-prone adjustments.

The invention is defined in the independent claim; the dependent claims relate to preferred further embodiments.

The invention provides an apparatus for attaching an objective to an objective mount of a microscope in such a way that a connection for an electrical add-on module for the objective is provided at the same time. Such an add-on module can be, for example, the aforementioned immersion retrofit set. The apparatus comprises an adapter ring and a module adapter. The adapter ring comprises an eye in which the objective can be mounted; objectives usually have so-called fine-thread collars. In such a case, the eye is equipped with a corresponding internal thread into which the fine thread collar of the objective can be screwed. The adapter ring can be further fastened to the objective mount. A bayonet-type fastening is usually used here, as standard objective mounts on nosepieces use corresponding bayonet locks. The adapter ring is therefore not necessarily part of the objective, but is connected to it, for example by screwing it on. The adapter ring comprises a ring axis, which usually coincides with the optical axis of the objective after it has been mounted on the adapter ring, and a ring face pointing towards the objective. In an orientation of the objective with the front lens facing upwards, this ring face represents the upper side of the adapter ring.

Insofar as the following description refers to the top or bottom or above or below, these terms refer to such an orientation of the objective with the front lens pointing upwards. This should not be confused with the fact that such a position of the objective is usually only present in an inverted microscope, whereas in a so-called upright microscope, in which the objective is located above a sample, the orientation is reversed. In this case, the top and bottom are reversed in the nomenclature. However, to avoid confusion, the terms are used throughout this description to refer to a position of the objective where its front lens is pointing upwards.

The adapter ring comprises electrical adapter contacts that are configured for connection to corresponding electrical mount contacts in the objective mount. These adapter contacts are usually located on the underside of the adapter ring, as here large surface areas are advantageously available for adapter contacts and mount contacts. The adapter ring also includes contact elements on one ring edge for electrical connection to the add-on module. The add-on module can ultimately be electrically connected to a data connection or a power supply via these contact elements and thus electrically coupled.

The module adapter comprises a base body, the underside of which can be fastened to the ring face of the adapter ring in a predetermined rotational position. It has an opening that does not cover the eye when the base body is fastened to the ring face of the adapter ring. The base body is attached to the upper side of the adapter ring, which is why the base body comprises the aforementioned opening in which the objective comes to rest when it is fastened to the adapter ring. The module adapter has electrical mating contact elements on the periphery of the underside of the base body, which are configured to match the contact elements on the ring edge of the adapter ring (in relation to the predetermined rotational position). They contact these contact elements arranged on the ring edge of the adapter ring when the base body is fastened to the ring face of the adapter ring in the predetermined rotational position. The term "rotational position" refers to a rotation around the ring axis.

A module holder extending parallel to the ring axis is arranged on the side of the base body, which does not cover the eye and the opening. It protrudes upwards (in the nomenclature used here), i.e. it extends along the objective, but outside the installation space that the objective occupies when it is fastened to the eye. The module holder is configured to hold the add-on module on its side facing away from the eye and thus away from the objective. It also comprises electrical module contacts for contacting the add-on module. These module contacts are conductively connected to the electrical mating contact elements in the module adapter.

In the overall structure, the module adapter is located between the adapter ring, which ensures the mechanical attachment and electrical connection of the objective to the objective mount, and the objective body itself or at least partially surrounds it above the adapter ring. Preferably, the base body is ring-shaped and then completely surrounds the lens body. The module holder is formed at one edge of the base body and at the same time outside the volume reserved for the microscope objective.

Because the base body is fastened to the ring face of the adapter ring in a predetermined rotational position, reliable contact with the contact elements provided on the adapter ring is possible. The electrical mating contact elements of the module adapter provided for this purpose are electrically connected to the electrical module contacts for contacting the add-on module, which are mounted in the laterally arranged module holder.

In this way, the mounting of the add-on module is greatly simplified and there is no restriction to certain combinations of objectives and add-on modules. It is not necessary to ensure that the add-on module is matched to the outer diameter of the objective shell in such a way that mating contact elements provided on the underside of the add-on module make reliable contact with the contacts on the adapter ring. It is also not necessary to ensure that a certain rotational position in relation to the adapter ring is maintained when attaching the add-on module, as this is already guaranteed by the module adapter. Both problems arose in the aforementioned variant 2 of DE 10 2020 111 716 A1. Also, the objective itself does not have to be prepared for the attachment of the add-on module, as is the case in variant 1 of DE 10 2020 111 716 A1.

The module holder can be universally configured. It provides a standard interface for any modules, both in terms of the electrical module contacts and the mechanical fastening. In this context, it is particularly preferable if the module holder comprises a convexly curved outer surface that lies at a constant radius to the ring axis of the adapter ring. In this way, a stop is created that ensures a defined position of the add-on module in relation to the optical axis of the objective, which eventually coincides with the ring axis of the eye. Thus, regardless of the specific design of the add-on module and the dimensions of the objective shell, there is a reference surface on which the add-on module can be supported in order to position elements, for example an immersion center channel, etc., in a completely defined position relative to the optical axis of the objective.

It is particularly preferred that the base body is configured as a ring that can be placed on the ring face. Locking elements and/or screw elements can then be provided on the adapter ring and on the base body, by means of which the base body and the adapter ring are locked and/or screwed together. Screw connections are particularly strong. In the case of a snap-in connection, tool-free assembly is ensured very easily. In this context, it is advantageous if the locking elements are configured on the ring face and are designed as pairs of locking pins and locking receptacles on the adapter ring under the base body. In this way, the module adapter can be attached to the adapter ring by a purely axial attachment movement.

The connection can be supplemented or realized by pairs of magnets and counter magnets, which are arranged on mutually facing sides of the adapter ring and base body and pull the module adapter onto the ring face or secure it there. Fitting elements can be provided independently of the specific connection technology in order to ensure the appropriate rotational position and thus guarantee a reliable connection of contact elements and mating contact elements.

The add-on module is particularly easy to attach if a hook rail, preferably configured in a U-shape, is arranged on the upper edge of the module holder, into which the add-on module can be hooked. Preferably, this hook rail interacts with magnets, which secure the suspended add-on module to the module holder with corresponding counter magnets on the add-on module.

Unwanted release of immersion liquids is a fundamental danger in microscopy. This applies in particular to inverted microscopes, as undesirably released immersion liquid can then run down the objective and enter the microscope stand. For example, it could interfere with the electrical contact between the adapter contacts and the module contacts and cause short circuits. It is therefore preferable to design the hook rail as a circumferential collar that directs unwanted immersion fluid released above the module holder away from the module contacts. This can be combined with an annular base body comprising a seal on the inside that seals towards the objective. Such a seal is of course also advantageous on its own.

To further protect the microscope stand from undesirably released immersion fluid, it is known to provide a so-called accident protection ring, which guides undesirably released immersion fluid away from the microscope stand above the adapter ring. Such a protective ring can now be attached particularly easily to the outside of the base body if this comprises a corresponding mounting flange, in particular comprising an annular groove, for attaching the protective ring. Any undesirably released immersion fluid is then drained away from the base body of the mounting adapter.

The rotational position of the mounting adapter on the adapter ring is ensured by the corresponding fastening. In order to also be able to adjust the rotational position of the add-on module particularly precisely and securely, it is preferable to form a recess, a hole or a projection above the module holder for the rotational alignment of an add-on module that is fastened to the module holder, with which the add-on module can engage in order to precisely fix the rotational alignment.

The summary above is not intended to describe each illustrated embodiment or every implementation of the present disclosure. The figures and the detailed description that follow more particularly exemplify these embodiments.

BRIEF DESCRIPTION OF THE DRAWINGS

The invention is explained in more detail below with reference to the attached drawings, which also disclose features essential to the invention. These embodiments are for illustrative purposes only and are not to be construed as limiting. For example, a description of an embodiment example with a plurality of elements or components is not to be interpreted as meaning that all of these elements or components are necessary for implementation. Rather, other embodiments may include alternative elements and components, fewer elements or components, or additional elements or components. Elements or components of different embodiments may be combined with each other, unless otherwise indicated. Modifications and variations described for one of the embodiments may also be applicable to other embodiments. To avoid repetition, identical or corresponding elements in different figures are designated with the same reference signs and are not explained more than once.

Figure 1A:
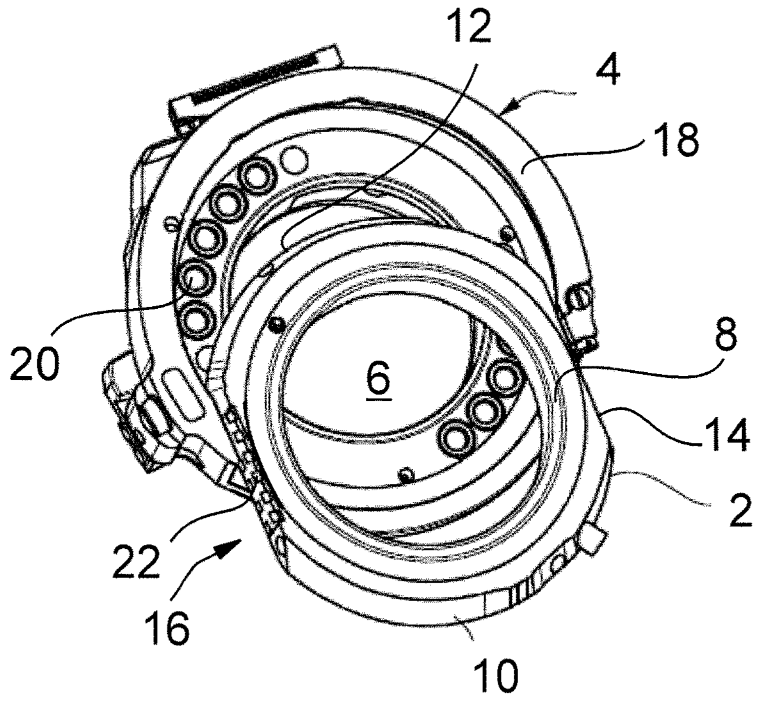
FIGS. 1A-1C depict an adapter for attaching an objective in various steps when fastening the adapter in a mount.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure as defined by the appended claims.

DETAILED DESCRIPTION

Figure 1B:
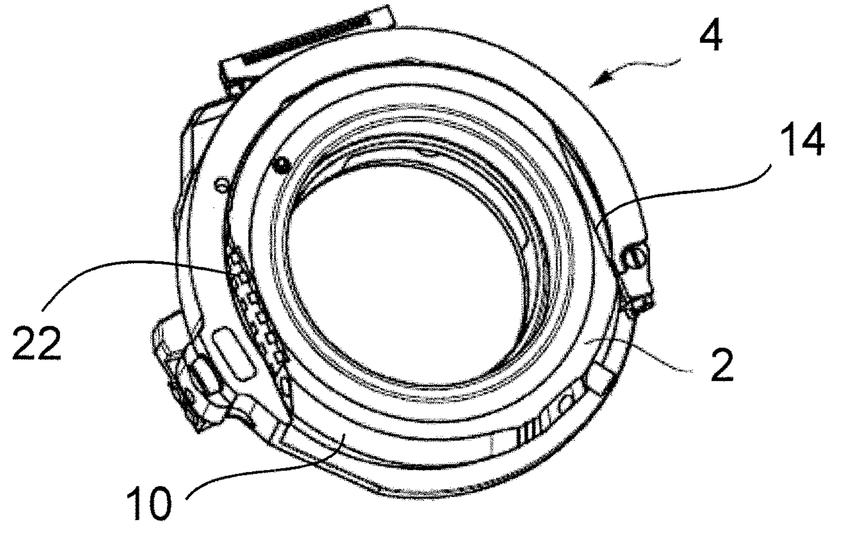

FIG. 1A shows a bayonet adapter ring 2 fastened to a receptacle 4 for objectives of a microscope. The adapter ring 2 comprises an eye 6 with a ring axis, which is provided with a thread 8 into which a microscope objective can be screwed. The objective is not shown in FIGS. 1A to 1C, as these are only intended to illustrate the bayonet principle of attaching the adapter ring 2 in the mount 4. The adapter ring 2 comprises two retaining flanges 10, 12 and two opposite flattened portions 14, 16, at which the adapter ring 2 is recessed relative to the outer circumference of the retaining flanges 10, 12. These flattened areas 14, 16 allow the adapter ring 2 to be pushed transversely to the ring axis into a retaining collar 18 of the holder 4 (FIG. 1A) until one of the retaining flanges 12 protrudes into the retaining collar 18 and the eye 6 is centered over the optical axis (FIG. 1B). The adapter ring 2 is then rotated in the holder until both retaining flanges 10, 12 engage in the retaining collar 18. At the same time, suitable means lock the adapter ring 2 in the mount 4.

Figure 1C:
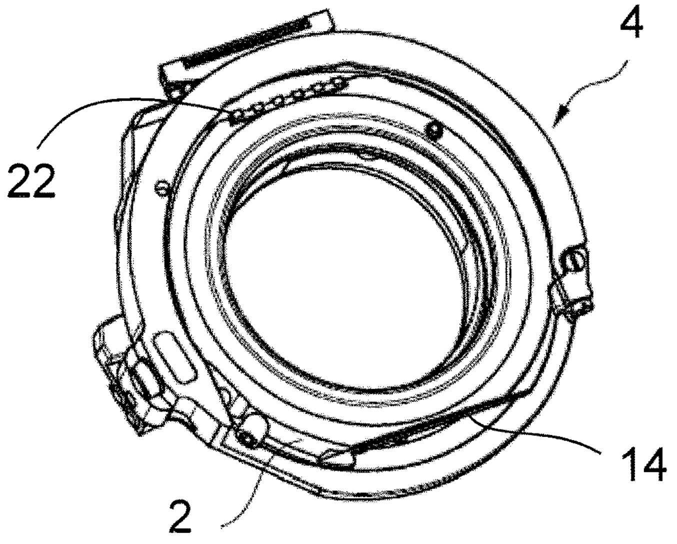

The mount 4 is part of an objective flange of a microscope and comprises electrical mount contacts 20, which are conductively connected to corresponding adapter contacts, which are not shown in FIGS. 1A to 1C, as they are arranged on the position of the adapter ring 2 on its rear side as shown in the figures, when the adapter ring 2 is locked in the mount 4 in the position shown in FIG. 1C. At one of the flattened areas, namely the flattened area 16, the adapter ring 2 comprises contact elements 22, the function of which will be explained below. They are preferably open axially, i.e. along the ring axis. The contact elements 22 are connected to the adapter contacts via electrical lines (not shown), which run in the adapter ring 2, so that there is an electrical connection between the contact elements 22 and the mount contacts 20 when the adapter ring 2 is in the inserted and locked position according to FIG. 1C, and at the same time the contact elements 22 are accessible in the axial direction.

Figure 2:
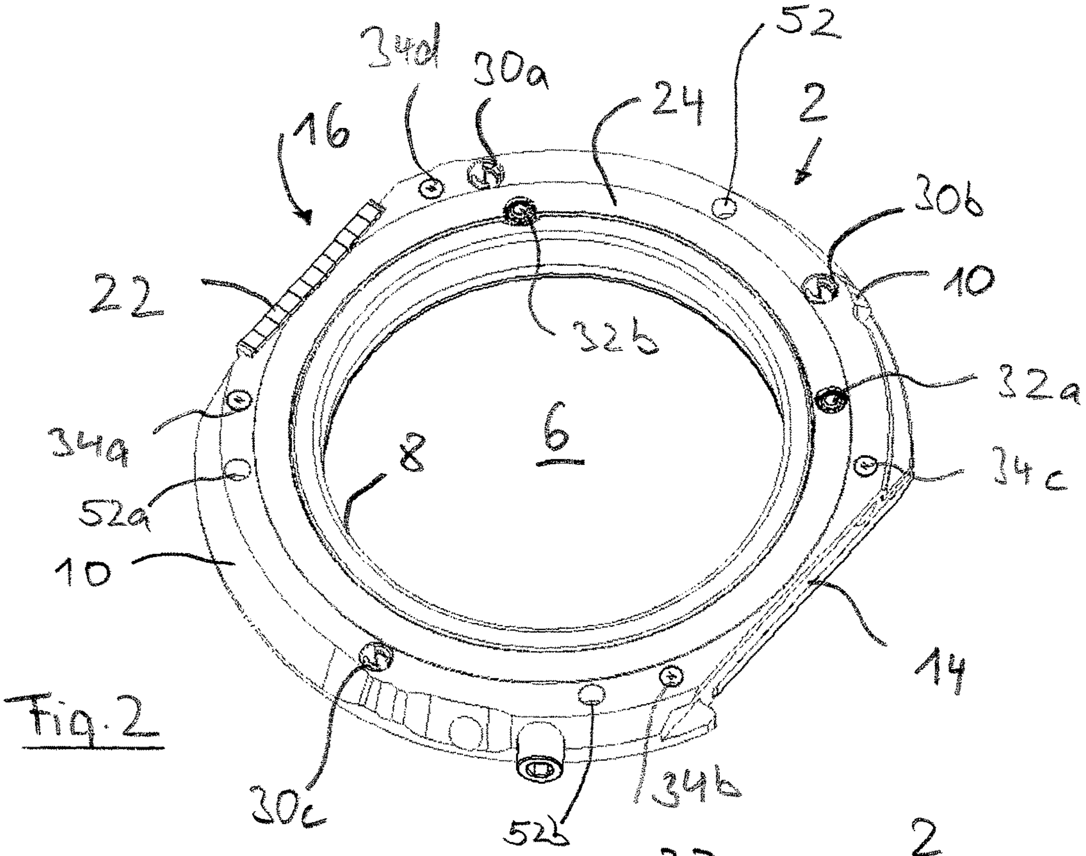
FIG. 2 is a top view of an adapter ring for bayonet fastening an objective to a mount.
Figure 3:
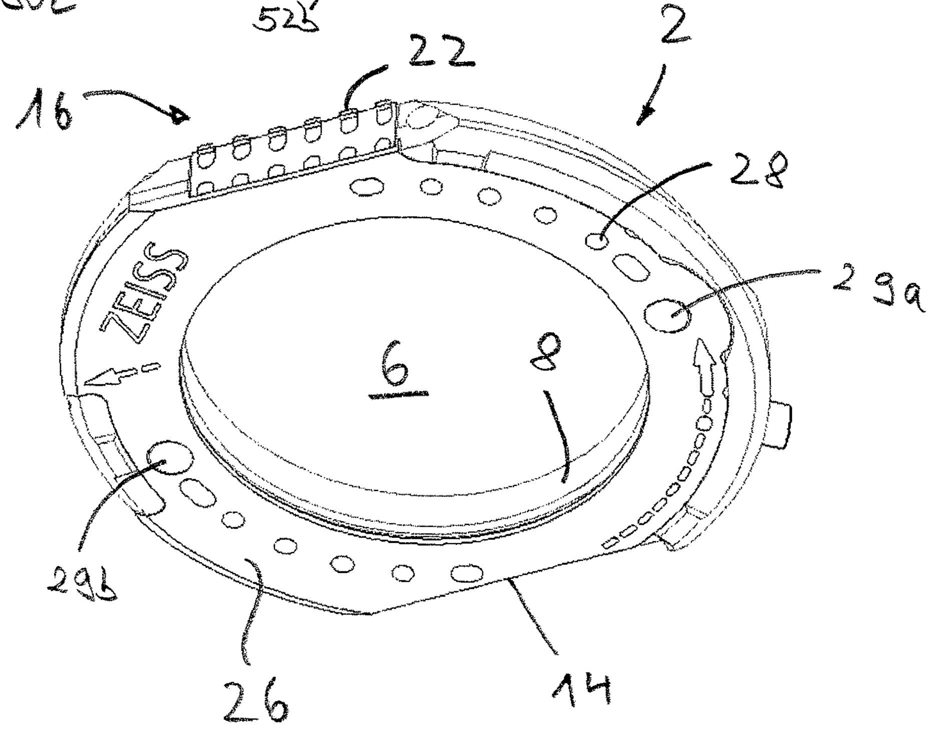
FIG. 3 is a view of the adapter ring of FIG. 2 from below, i.e. from the side facing a microscope stand.

FIG. 2 shows the adapter ring 2 in a first embodiment in a perspective position that essentially corresponds to that of FIGS. 1A to 1C. In this position, the objective, when inserted into the eye, would extend obliquely upwards from the drawing plane. It is easy to see that the adapter ring 2 extends annularly around an eye 6, with a ring face 24 located at the boundary surface at the top in FIG. 2, which represents the upper side of the adapter ring 2 facing the objective. The objective would protrude upwards from this upper side 24. FIG. 3 shows the adapter ring 2 in a view from below, i.e. from the underside 26, which faces the mount 4.

The adapter contacts 28 can therefore be seen as small circles, one of which is marked with the reference sign 28. Preferably, magnets 29*a, b* are located on the underside 26, which interact with counter-magnets on the receptacle 4 and assist in turning the adapter ring 2 into the correct position in the receptacle 4, as shown in FIG. 1C.

In the embodiment shown in FIG. 2, the adapter ring 2 comprises three clamping sleeves 30*a*, 30*b* and 30*c* in the ring face 24. They have the function of a snap-in receptacle, which will be explained in more detail below, and each form part of a pair of a locking pin and a locking receptacle.

Two electrical objective contacts 32*a*, 32*b* are also arranged on the ring face 24 for passing electrical signals or supply voltage to a correspondingly equipped objective. As FIG. 2 shows, these are located at different radial positions in relation to the center of the eye 6 and can thus make contact with radially spaced slip rings on an objective in order to enable the electrical connection, for example, of an electrical drive in the microscope objective. The objective contacts 32*a*, 32*b* are also connected to adapter contacts 28.

Figure 8:
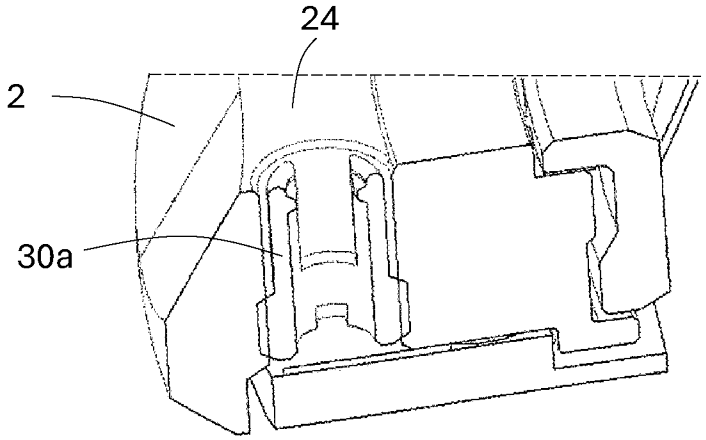
FIG. 8-10 depict detailed views of the axial fixing of the module adapter of FIG. 4 on the adapter ring of FIG. 2.
Figure 9:
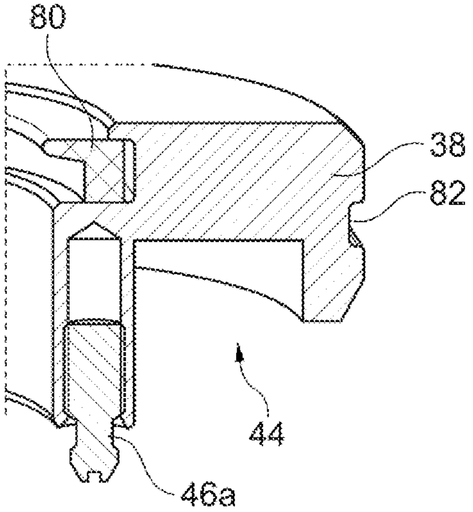
Figure 10:
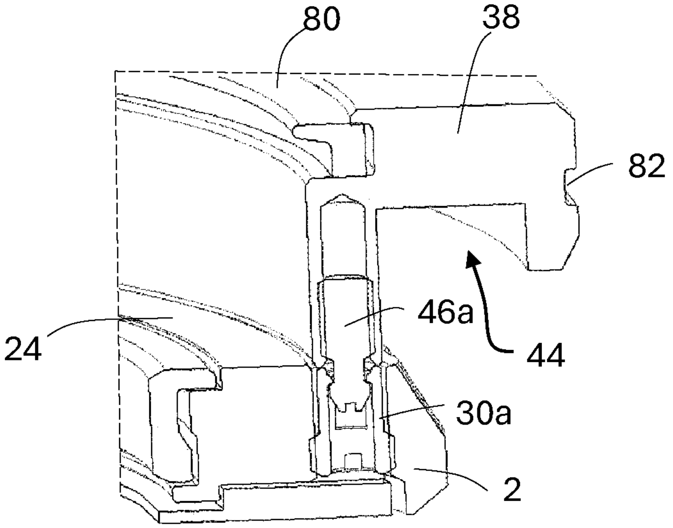

The clamping sleeves 30*a* to 30*c* and magnets 34*a* to 34*d* are used to attach a module adapter 36 to the ring face 24. This module adapter 36 is shown in a first embodiment in FIGS. 4 and 5, and in a second embodiment in FIG. 7. It comprises a ring body 38 as a base body, which leaves a ring opening 40 free and can be placed on the ring face 24 of the adapter ring 2. The underside 44 of the ring body 38 shown in FIG. 4 rests on the ring face 24. On the opposite side, a module holder 42 extends upwards on the ring body 38, i.e. parallel to the objective (clearly visible in FIG. 20). Four locking pins 46*a* to 46*c* are provided on the underside 44, which are configured to engage in the clamping sleeves 30*a* to *c* in order to secure the ring body 38 of the module adapter 36 to the ring face 24 of the adapter ring 2. FIGS. 8 to 10 show in detail the interaction of the clamping sleeves, in this case the clamping sleeve 30*a* on the adapter ring 2, with the locking pin, in this case the locking pin 46*a* on the ring body 38.

The reference signs in the figures are chosen so that the locking pin 46*a* is inserted into the clamping sleeve 30*a*, etc. Counter magnets 48*a* to 48*d* on the underside 44 are provided in a suitable position relative to the magnets 34*a* to 34*d* on the ring face 24 and assist the correct rotational positioning of the ring body 38 on the ring face 24. In addition, guide pins 50*a* to 50*c* are formed on the underside 44, which are, when the ring body 38 is positioned on the ring face 24, inserted into guide holes 52*a* to 42*c* formed there. The combination of guide pins 50*a* to *e* and guide holes 52*a* to *c* ensures very precise adjustment with regard to the rotational position, the pairs of magnets 34*a* to 34*d* and counter magnets 48*a* to 48*d* make it easier to find this rotational position, as they guide the ring body 38 into the corresponding rotational position relative to the adapter ring 2 when it is attached, and the locking elements consisting of pairs of locking pins 46*a* to 46*c* and locking receptacles in the form of clamping sleeves 30*a* to 30*c* fix the module adapter 36 axially, i.e. perpendicular to the ring surface 24. i.e. perpendicular to the ring face 24 or along the ring axis of the adapter ring 2 and the ring body 38.

The correct rotational position of the module adapter 36 on the adapter ring 2 is also relevant because the ring body 38 further comprises electrical mating contact elements 54 on its underside 44, which make contact with the contact elements 22 when the ring body 38 is placed on the adapter ring 2 in the predetermined rotational position. In this way, electrical contact to the module holder 42 is achieved. This has a module holder 56, which points away from the opening 40 and thus away from the objective. Electrical module contacts are configured on this module holder 6, which are connected through to the mating contact elements 54 and are thus actually connected to the contact elements 22 and thus to the adapter contacts 28.

Figure 5:
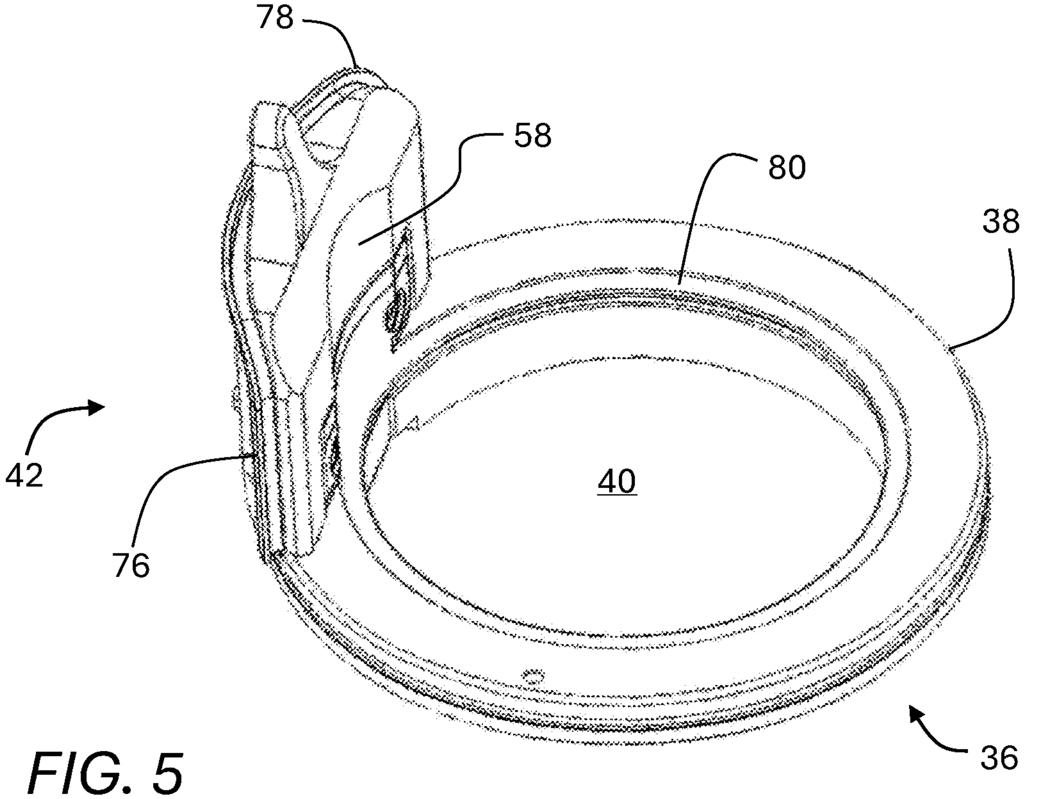
FIG. 5 is a top view of the module adapter of FIG. 4, i.e. from the side on which the objective is to be inserted.

FIG. 5 shows the module holder 36 from above. It can be clearly seen that the module holder 42 comprises a recess 58 which is concave in shape and thus serves as a clearance for the outer circumference of the objective, which would protrude upwards in the orientation shown in FIG. 5 and can thus protrude into the concave recess 58.

Figure 4:
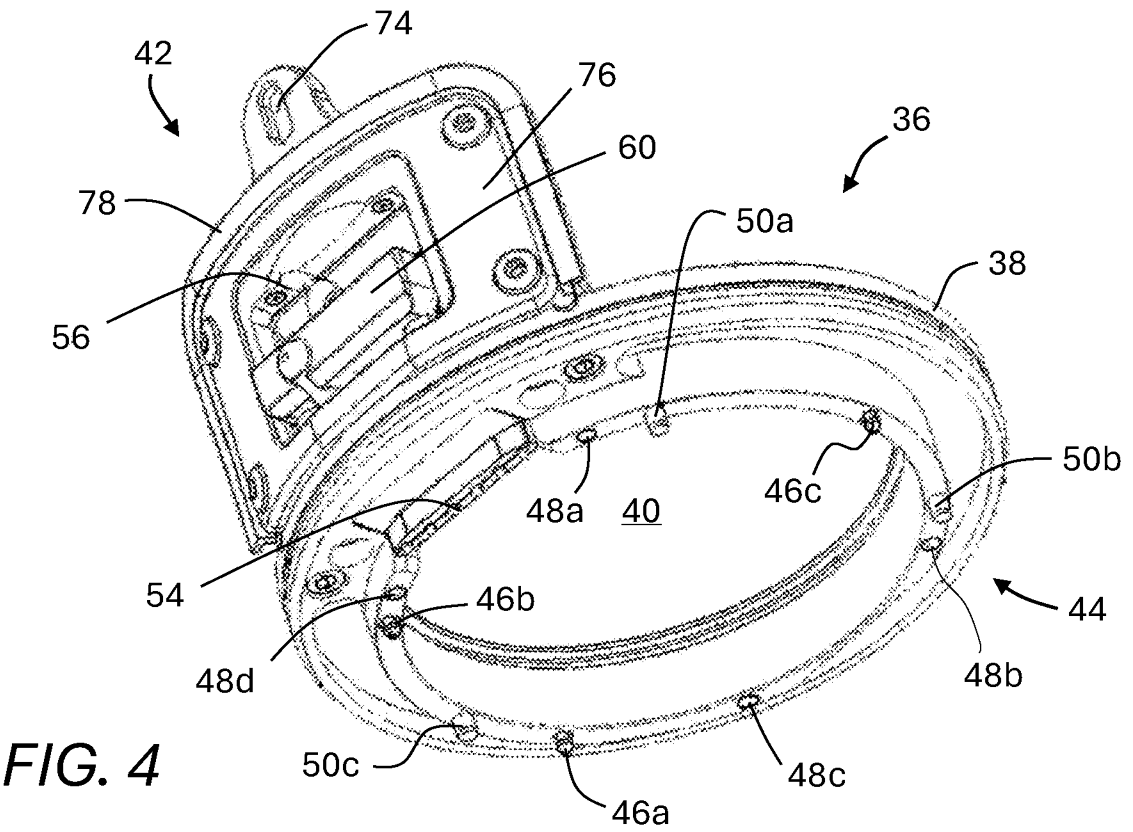
FIG. 4 is a perspective view of a module adapter fastened to the adapter ring of FIGS. 2 and 3.
Figure 6:
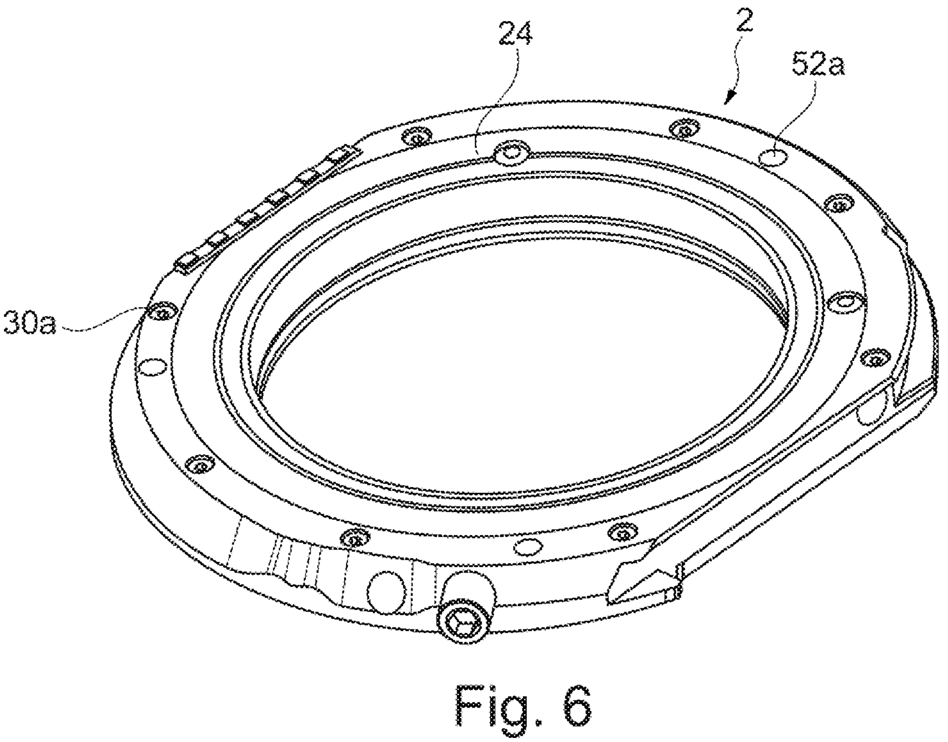
FIG. 6-7 depict modifications of the adapter ring of FIG. 2 and the module adapter of FIG. 4, whereby the modification concerns the attachment of the module adapter to the adapter ring.
Figure 7:
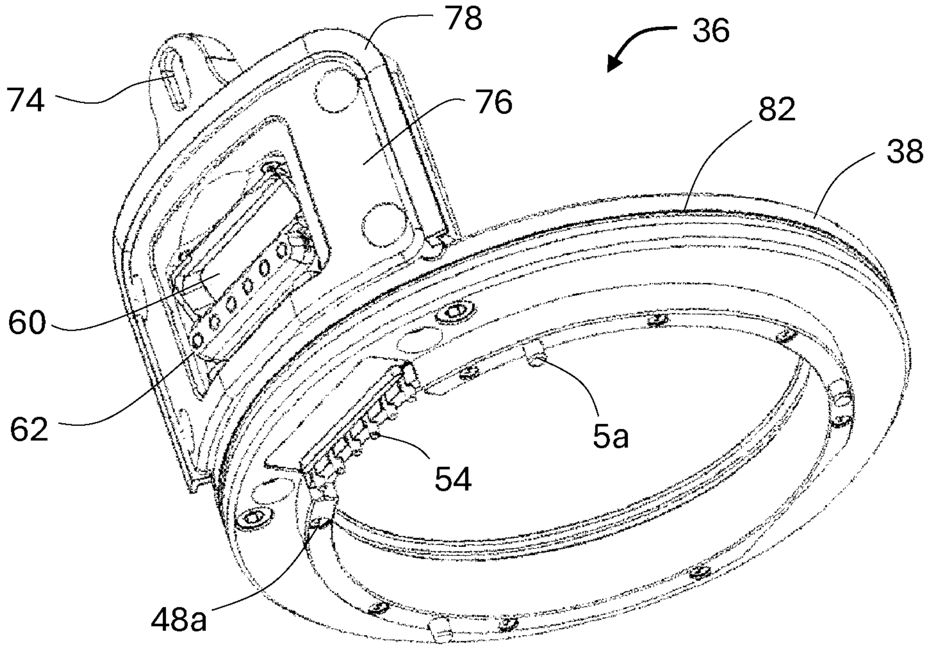

The embodiment shown in FIGS. 6 and 7 varies the design of the adapter ring 2 and module adapter 36 with regard to mutual fastening. This embodiment is particularly suitable for inverted microscopes, in which an objective in actual use is attached to the microscope stand with its surface pointing downwards. In this case in particular, the force of magnets and counter magnets, of which only reference signs for the pair 30*a*, 48*a* are shown here, together with the guide pins and the guide holes, of which only the pair 50*a*, 52*a* are provided with reference signs here, is sufficient to secure the ring body 38 to the guide surface 24 of the adapter ring 2. As FIGS. 4 and 6 show, eight pairs of magnets/countermagnets are provided in this embodiment for particularly good magnetic retention, which is why this embodiment is in principle also suitable for an upright microscope in which the objective is fastened to the stand with the flange pointing upwards. Except for the attachment of the ring body 38 to the ring face 24, the embodiment of FIGS. 6 and 7 corresponds to that shown in FIGS. 2 to 5. The corresponding elements are therefore not illustrated again and repeated. However, the representation of FIG. 7 differs from FIG. 4 in that a protective cap 60 is folded open over a module contact block 62, which is shown established in FIG. 4. Thus, FIG. 7 shows the module contacts that are connected to the mating contact elements 54. They are combined in a module contact block 62.

Figure 11:
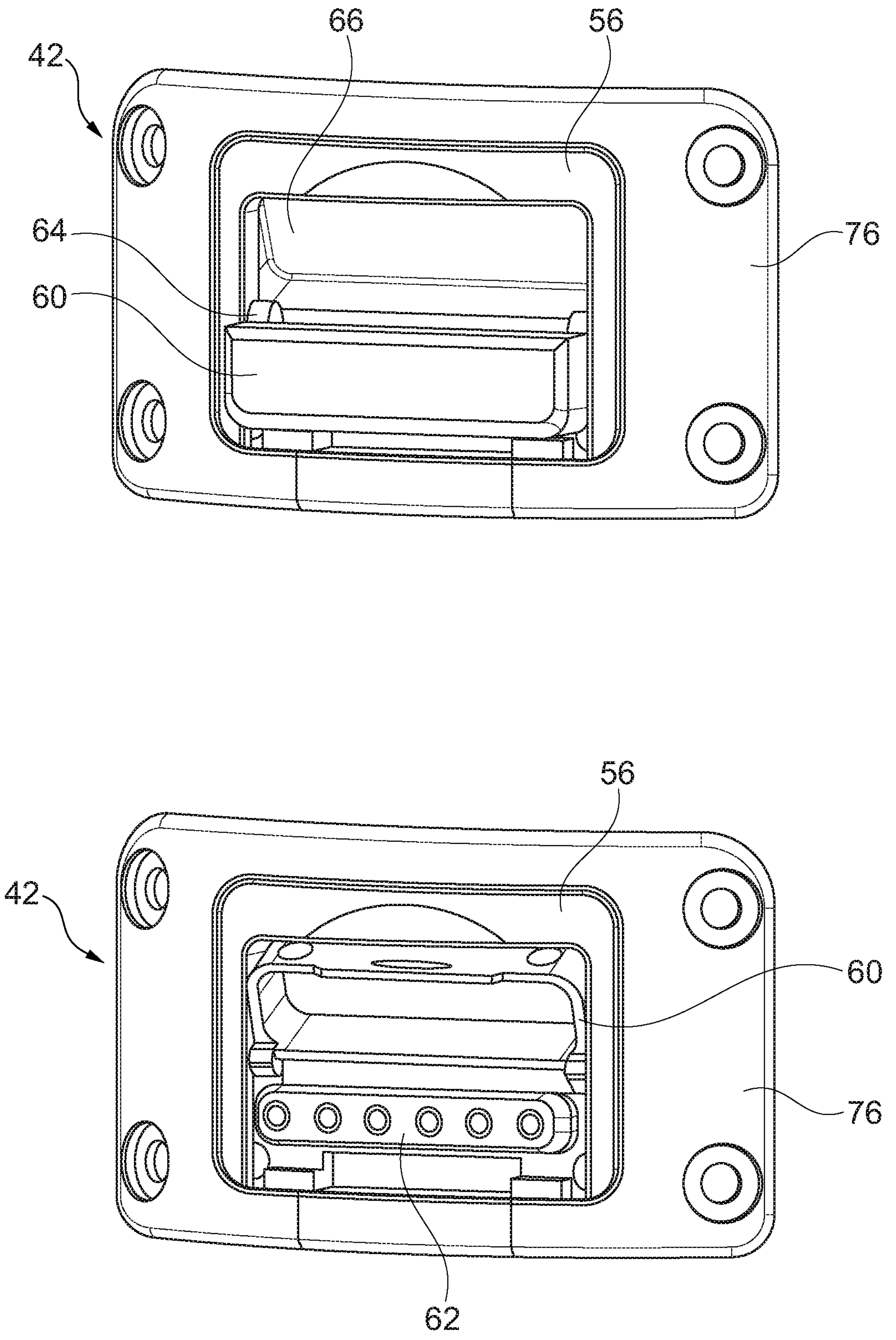
FIG. 11 is top views of a module holder of the module adapter of FIG. 4, 5 or 7 in two different states, namely with an installed or opened protective cap over a module contact strip.

FIG. 11 shows the closed and open state of the protective cap 60 in detail in two illustrations. It is attached to a hinge 64 and can be folded upwards into a recess 66. It is preferably held open and/or closed by means of magnets.

Projections are also arranged in the module holder 56, which will be explained below and which allow a module, for example an immersion module, to be hooked in.

Figure 12:
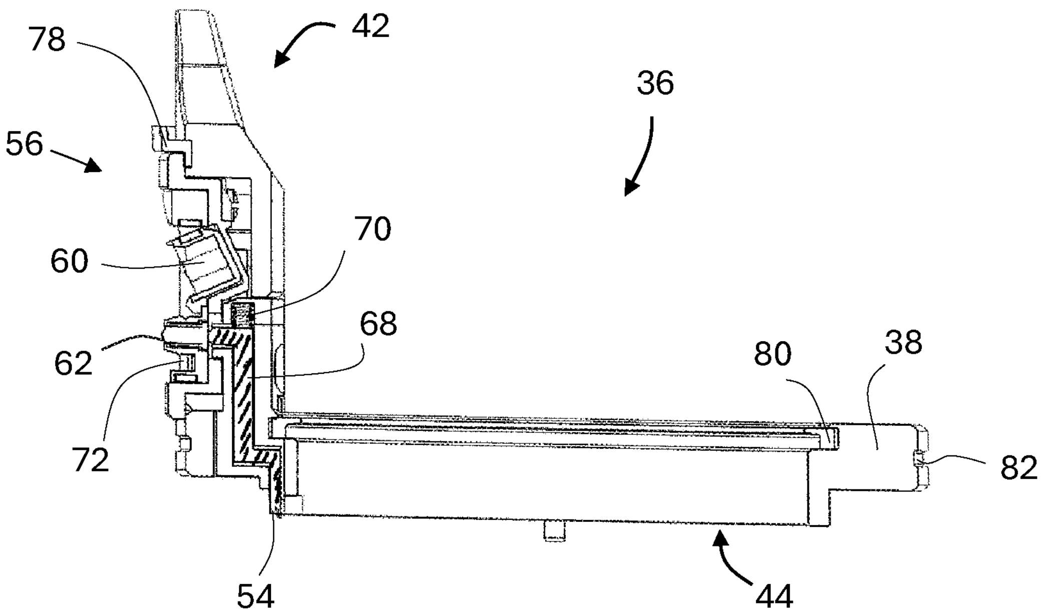
FIG. 12 is a sectional view of the module adapter with the protective cap opened.
Figure 13:
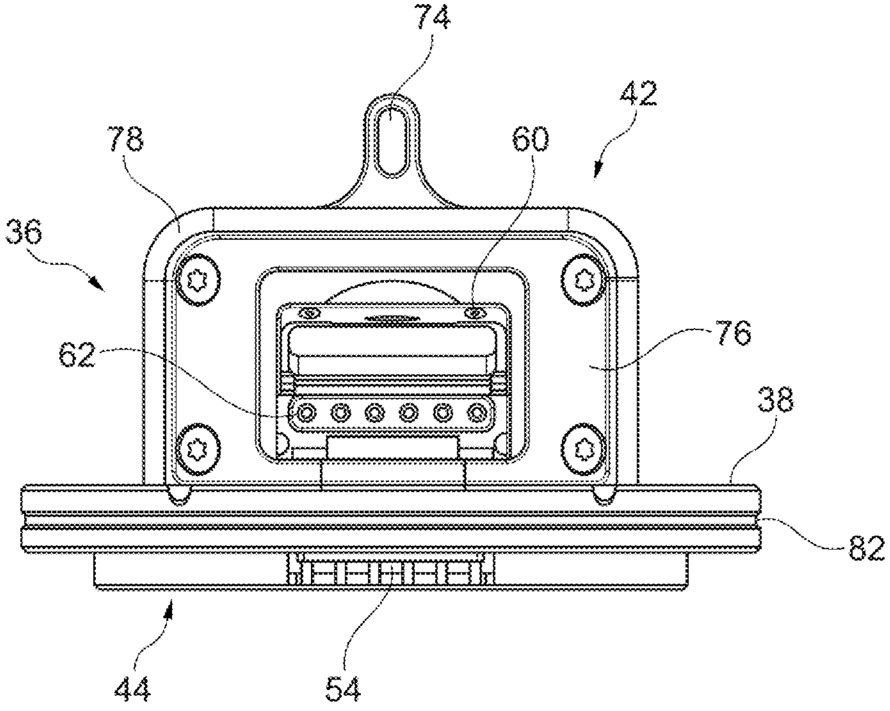
FIG. 13 is a side view of the module adapter of FIG. 12.
Figure 14:
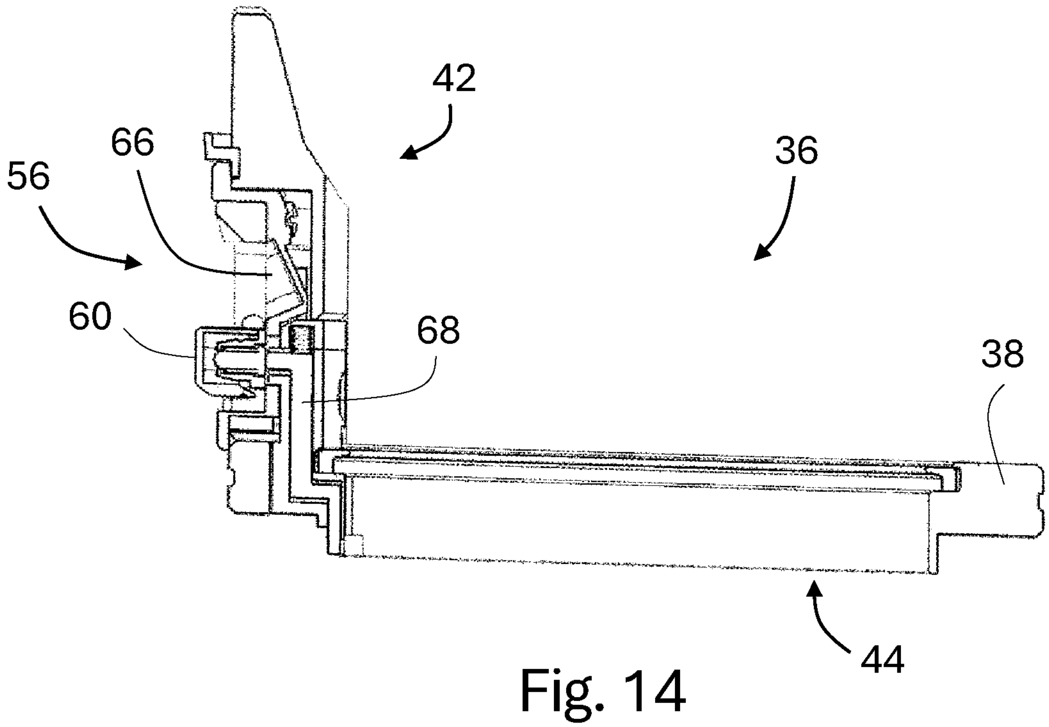
FIGS. 14-15 are views corresponding to FIGS. 12 and 13, but with the protective cap closed.
Figure 15:
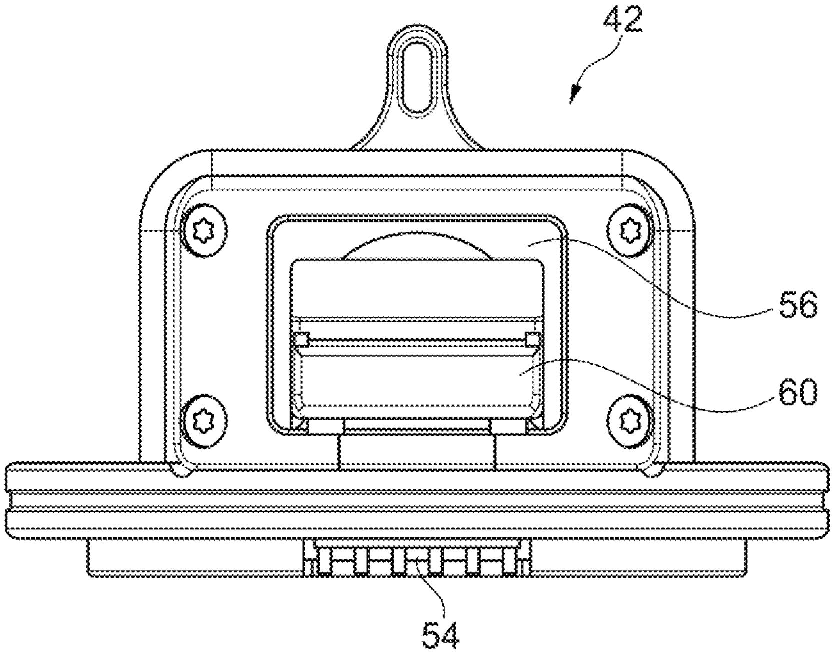

FIGS. 12 and 13 show a section through the module adapter 36 in such a way that the electronic connection from the module contact block 62 to the module contact 54 is apparent. FIG. 13 shows a top view similar to FIG. 11, whereby the ring body 38 and the mating contact elements 54 can now also be seen. FIGS. 14 and 15 correspond to the illustration of FIGS. 12 and 13, but here the protective cap 60 is closed. Preferably, it is (also) locked in this position by means of magnetic force. Magnets can be used here, which are arranged at the bottom edge of the protective cap 14 in FIG. 14.

Figure 17:
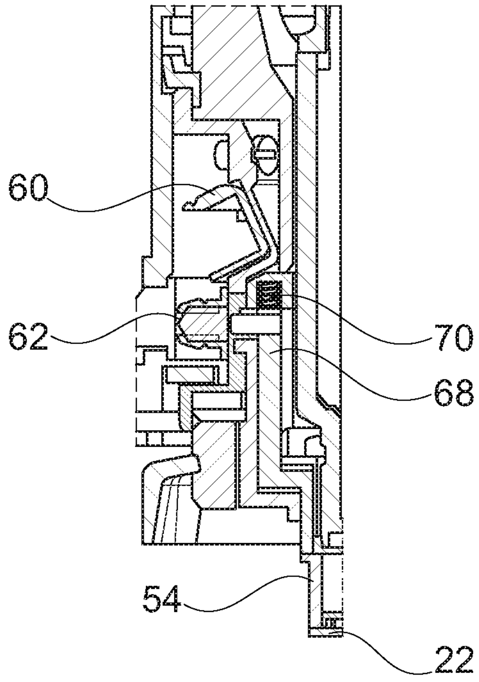
FIG. 17 is an enlarged view of the section through the module holder of FIG. 12.

FIG. 12 shows, hatched, a multi-angled element that establishes the electrical connection to one of the module contacts in the module contact block 62. The element in question is a contacting pin 68, which on the one hand is electrically connected to one of the module contacts in the module contact block 62 and on the other hand protrudes from the underside 44, thus forming a mating contact element 54. The contacting pin 68 is highlighted by hatching in FIG. 12. It is tensioned by a spring 70 towards the underside 44, so that the mating contact element 54 protrudes spring-loaded from the underside 44 and is thus pressed by the spring 70 onto the contact element 22 assigned to it when the module adapter 36 is placed on the ring face 24. FIG. 17 shows an enlarged view of the electrical contact top an element of the module contact block 62 via the contacting pin 68, which is loaded by the spring 70 and whose free end, which represents a module contact 54, is pressed onto a contact element 22. It can also be seen here that the contact elements 22 on the adapter ring 2 are configured in such a way that they can be contacted in the axial direction. For example, they protrude radially in an appropriate manner.

In this context, it is advantageous that such a contact is made by a purely axial movement, i.e. there is no rotation about the axis of the eye 6 or the axis 40 of the ring body 38. In this way, the contacting pin 68 is pressed upwards against the spring 70 during contacting and rests spring-loaded with its end forming the mating contact element 54 on the associated contact element 22. Such axial displacement of the contacting pin 68 occurs only to a small extent, and contact in the module contact block 62 is possible by means of a corresponding sliding contact of the contacting pin 68. Of course, a contacting pin 60 and a module contact in the module contact block 62 are provided for each contact element 22. In FIG. 13, there are six individual module contacts in the module contact block 62.

FIG. 12 further shows a hook rail 76 at the upper edge of the module holder 56, which is configured for hooking in an add-on module. An elongated hole 74 provided on the upper side of the module holder 42 serves as a groove for the radial alignment of an add-on module fastened to the module holder 56. The convexly curved outer surface 76 of the module holder defines a mounting diameter for add-on modules, as it lies at a constant radius to the ring axis. It thus ensures a defined position of the add-on modules relative to the lens axis, which coincides with the ring axis of the eye 6 or the opening 40.

The hook rail is preferably a circumferential collar 7 and serves as so-called damage protection, as it prevents damage to the objective from unwanted release of immersion fluid by draining any immersion fluid by means of the collar. It interacts with a sealing ring 80, which is provided on the inner edge of the ring body 38 and seals towards the objective.

On its outer circumference, the ring body 38 comprises a groove 82 into which an damage protection ring 84 can be inserted. In an inverted arrangement of the objective, in which the adapter ring 2 is lower than the tip of the objective, this ring diverts any immersion fluid away from the adapter ring 2 and thus from the mount 4 and the microscope stand.

Figure 16:
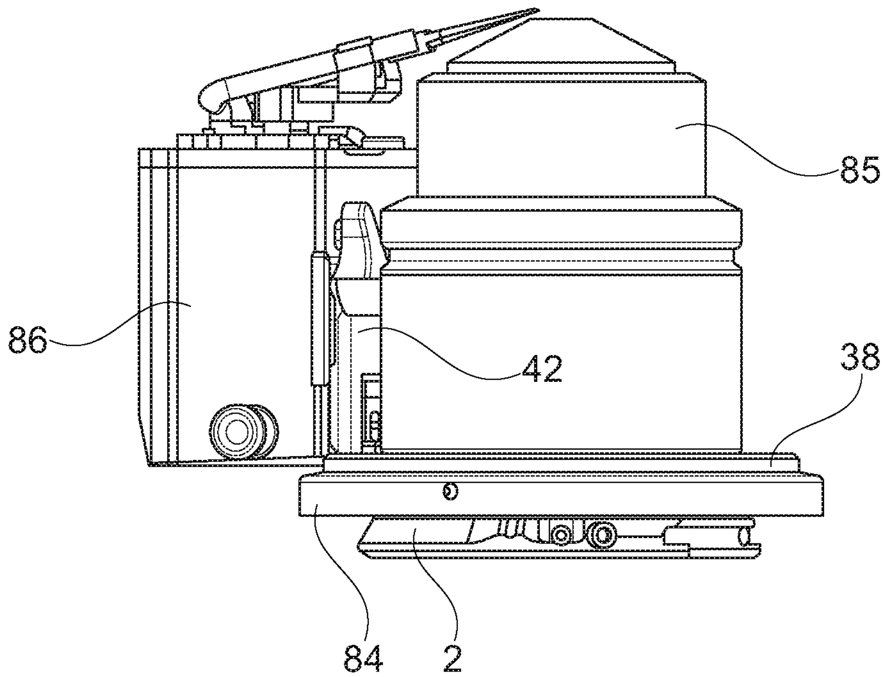
FIG. 16 is a side view of the adapter ring with module adapter fastened to it, inserted objective and add-on module attached to the module adapter.

FIG. 16 shows an objective 85 fastened to the adapter ring 2. An immersion set 86 is attached to the module holder 42. It can be of the type described in DE 10 2020 111 716 A1, for example.

FIGS. 18 to 23 show the various steps for assembling the adapter ring 2, module adapter 36, damage protection ring 84, objective 85, mount 4 and finally immersion set 86. This can be done without tools.

Figure 18:
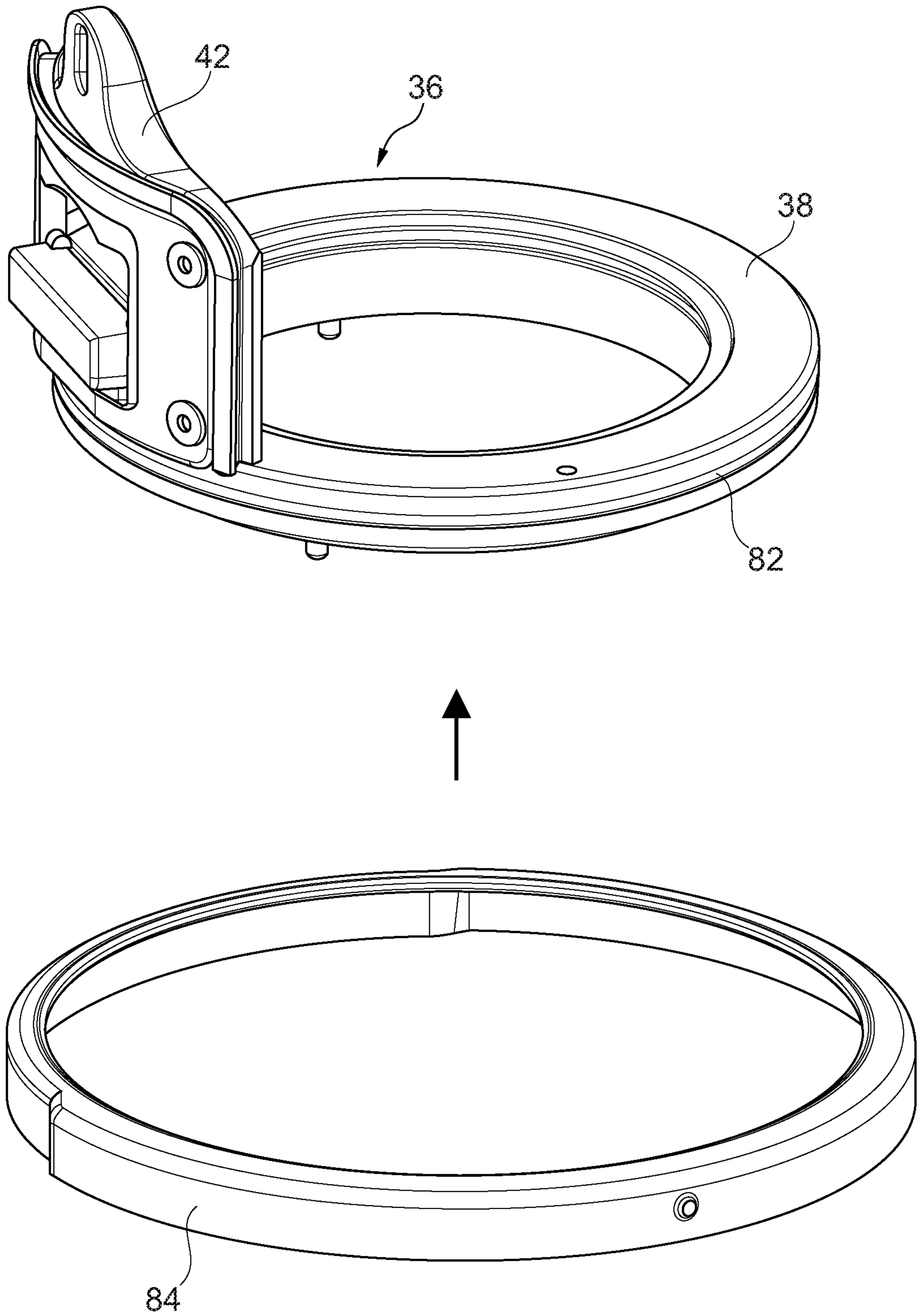
FIG. 18-23 depict various steps in the assembly of the module adapter, accident protection ring, adapter ring, objective, objective revolver and add-on module.

First, the damage protection ring 84 is clipped into the groove 82 of the ring body 38 as shown in FIG. 18. Fitting markings on the damage protection ring 84 and the ring body 38 make it easier to find the correct rotational position in embodiments in which the damage protection ring 84 is not completely rotationally symmetrical, for example because it has recesses, etc. The assembly is carried out along the arrow shown in FIG. 18.

Figure 19:
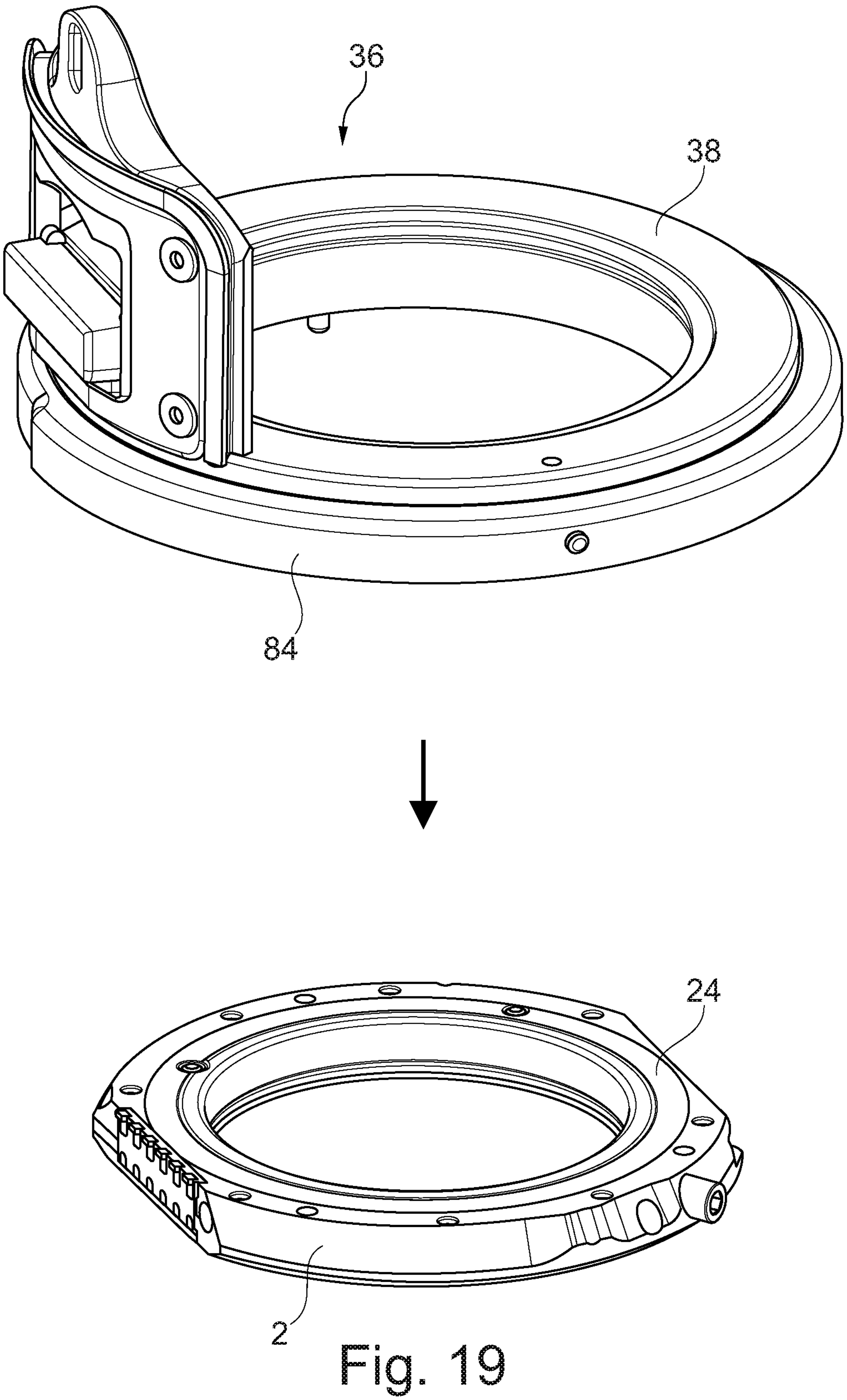

Then, as shown in FIG. 19, the unit comprising the module adapter 36 and the damage protection ring 24 is placed on the ring face 24 of the adapter 2, and the module adapter 36 and the adapter ring 2 are joined together.

Figure 20:
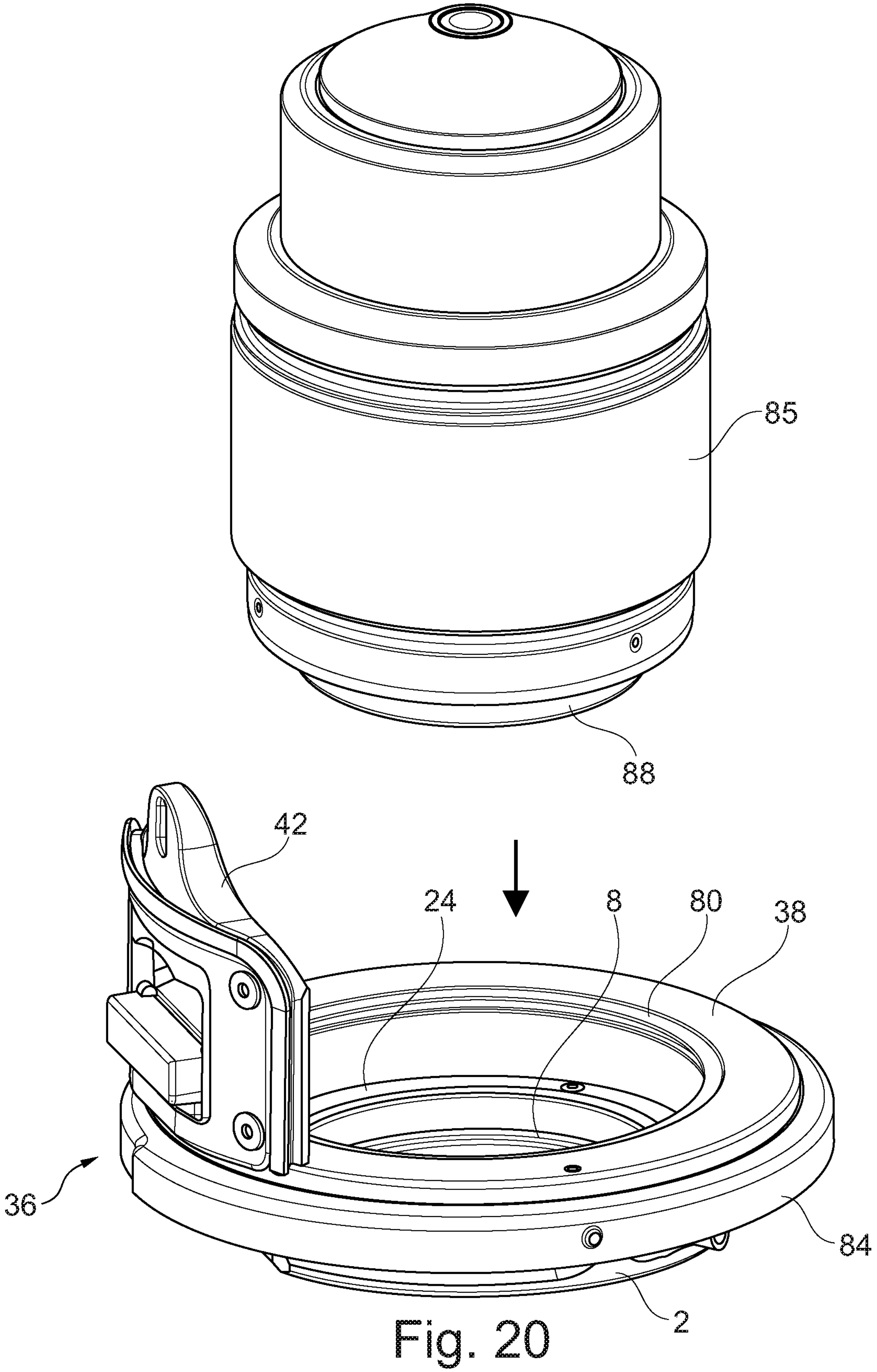
Figure 21:
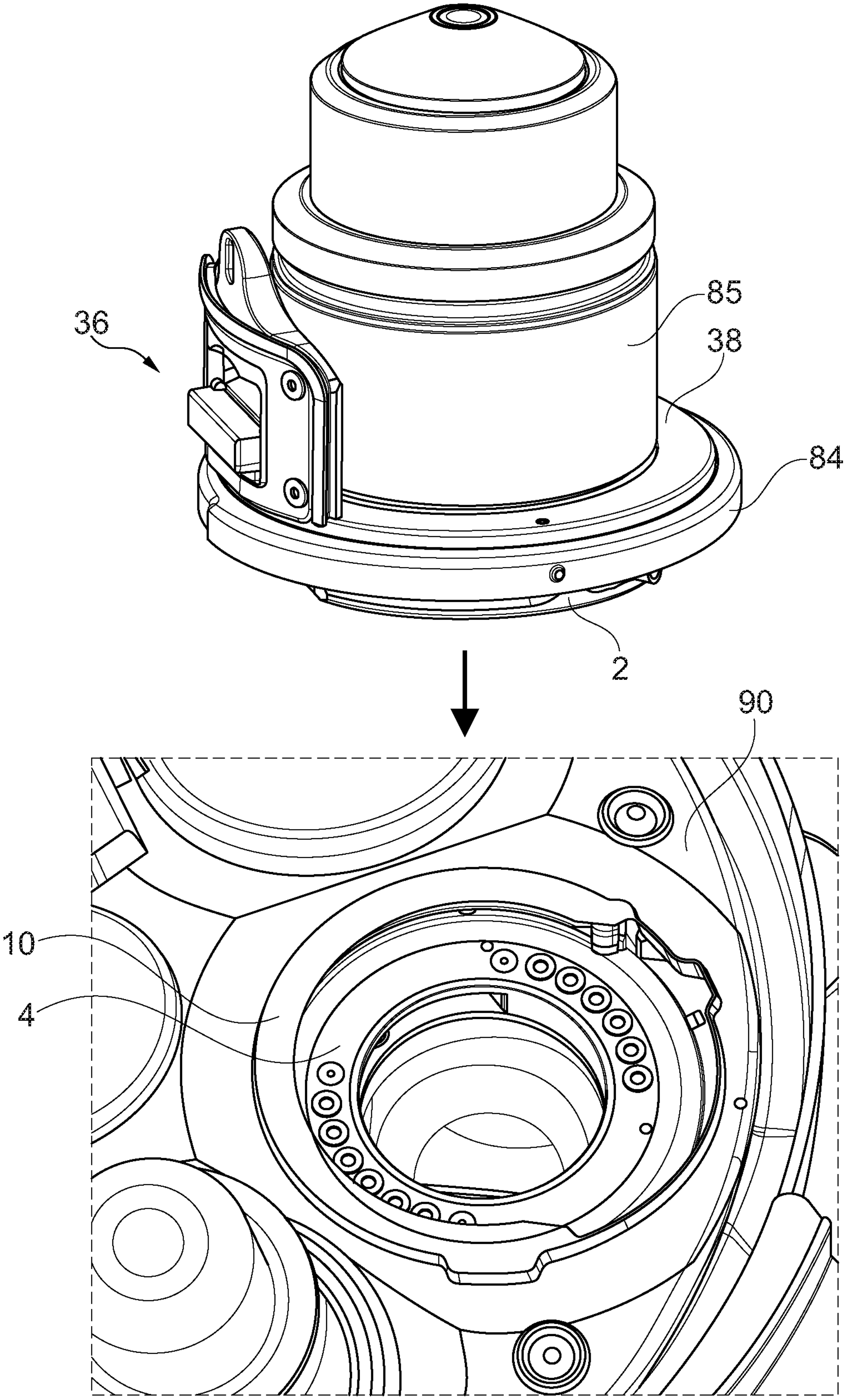

Next, as FIG. 20 shows, the objective 85 is screwed with its objective thread 88 into the thread 8 on the adapter ring 2. This is done in the orientation of the unit comprising adapter ring 2 and module adapter 36 shown in FIG. 20, i.e. in such a way that the module adapter 36 lies between the adapter ring 2 and the objective 85. In some embodiments, the exact rotational position is not important, because the adapter ring 2 and the module adapter 36 already ensure the necessary position with regard to the attachment of the add-on module relative to the mount 4. If necessary, the sealing ring 80 is only inserted shortly beforehand, as its ring width must be matched to the outer diameter of the objective 85.

A corresponding mating surface of the objective 85 lies against the ring face 24. Since this contact determines the axial distance of the objective from the mount and thus from the rest of the optical path of the microscope, it may be necessary in embodiments to adjust this distance. Optional tuning rings are provided for this purpose, which are designed as flat ring disks of a defined thickness and are placed on the surface 24. They thus come to lie between the ring body of the adapter ring 2 and a lower fitting surface of the microscope objective, whereby the thickness of these ring washers adjusts the axial position of the microscope objective 85 relative to the register elements that align the adapter ring 2 in the mount 4, and thus finally relative to the microscope.

Now the assembled combination of objective 85, module adapter 36 and (generally optional) accident protection ring 84 and adapter ring 2 is inserted into the mount 4, which can be arranged on a nosepiece 90, for example. The bayonet-type fastening procedure previously explained with reference to FIGS. 1A to 1C is carried out, i.e. the adapter ring 2 is first inserted laterally into the retaining collar 10 and then rotated into the locking position.

Figure 22:
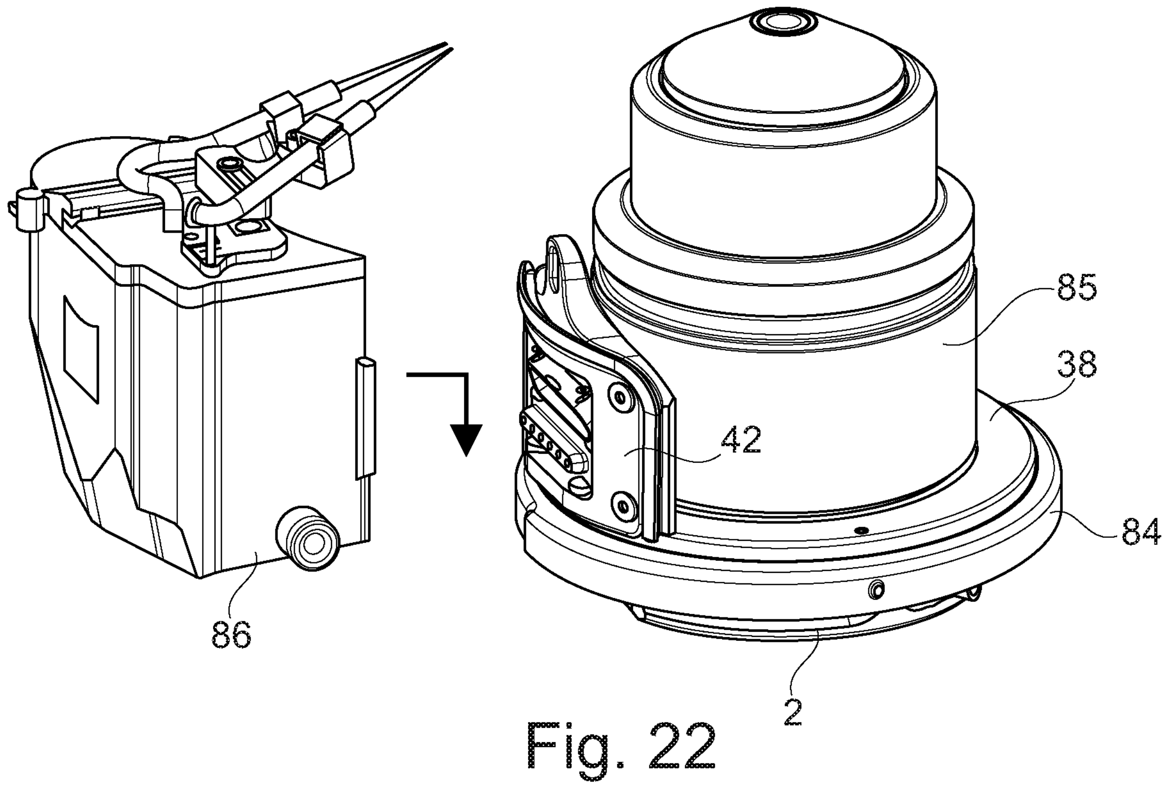
Figure 23:
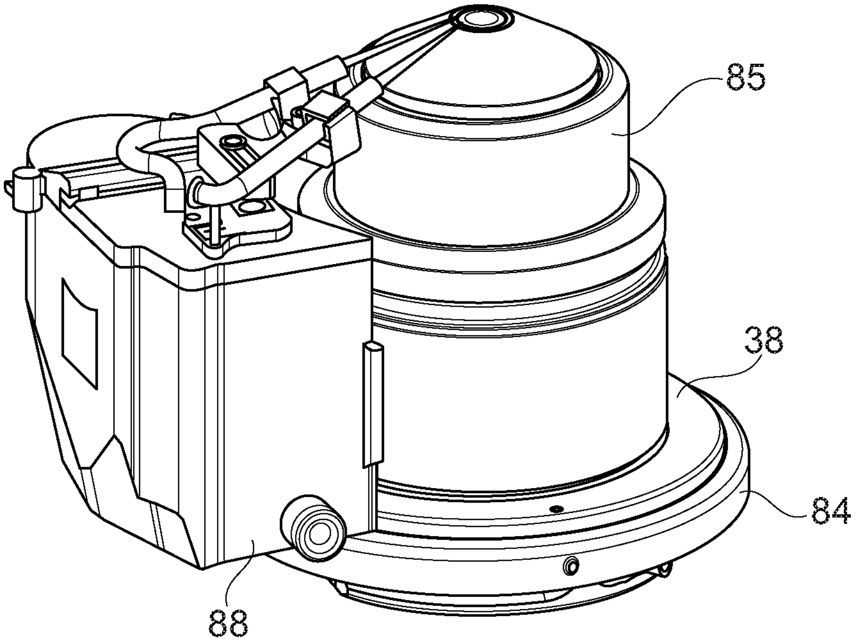
Figure 24:
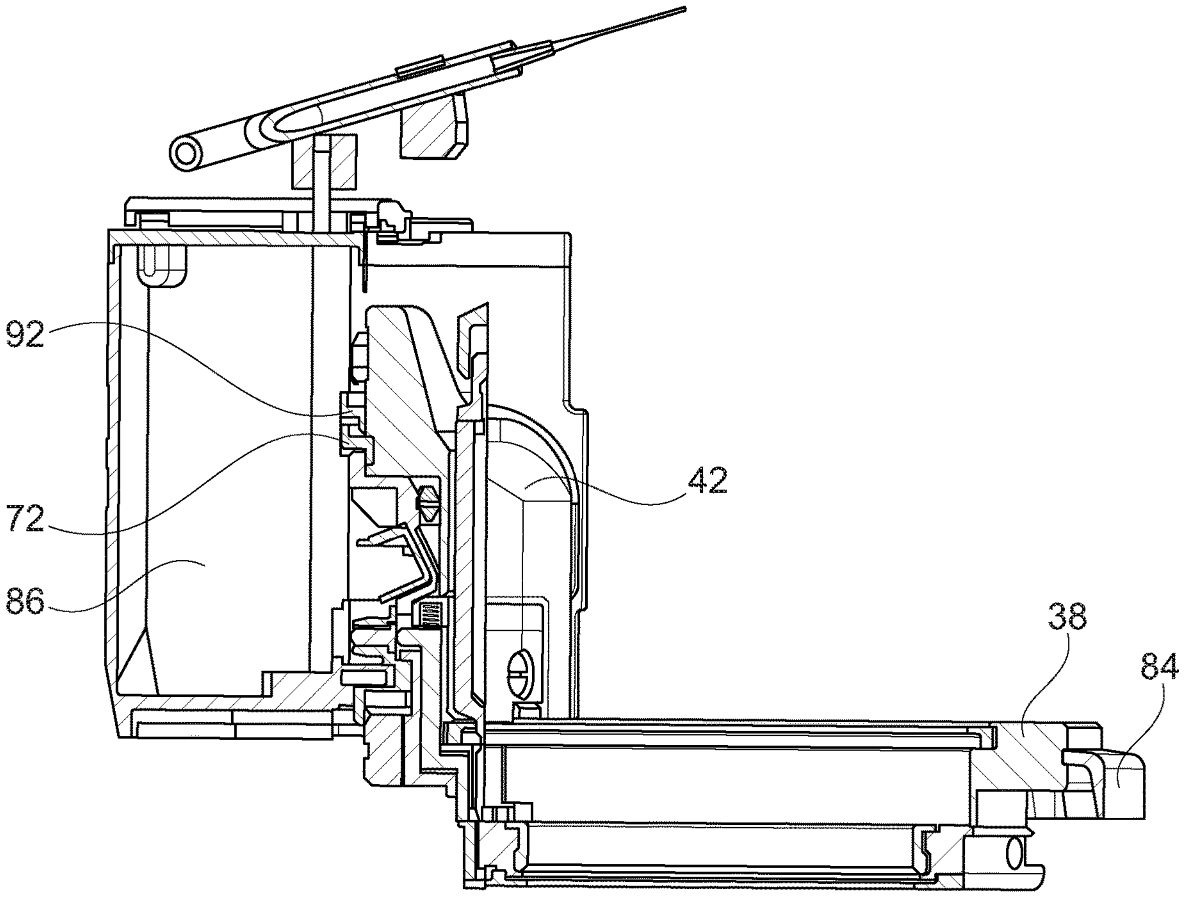
FIG. 24 is a sectional view similar to FIG. 12 but with the add-on module fastened to it.
Figure 25:
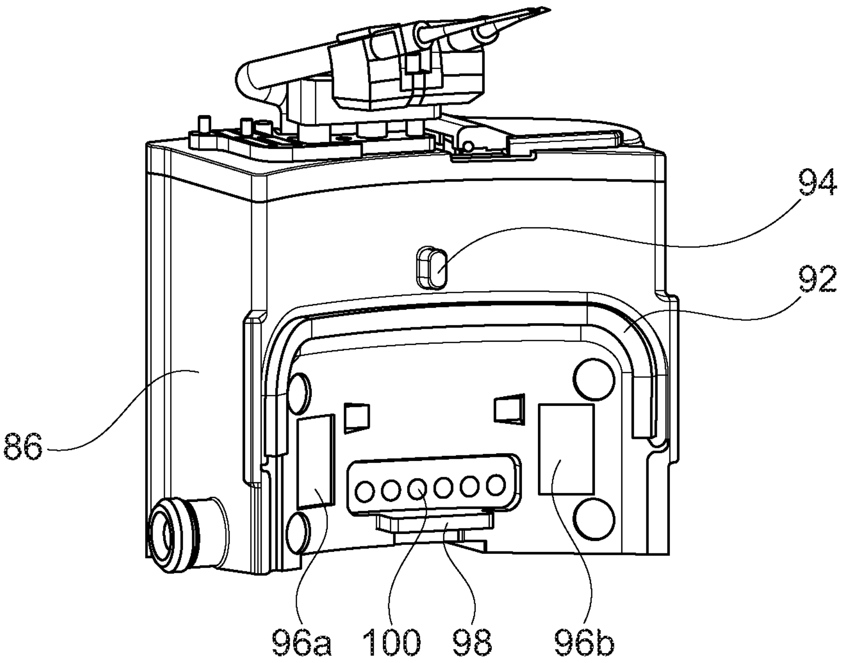
FIGS. 25-26 are perspective views of the add-on module seen from the side, fastened to the module holder of the module adapter.
Figure 26:
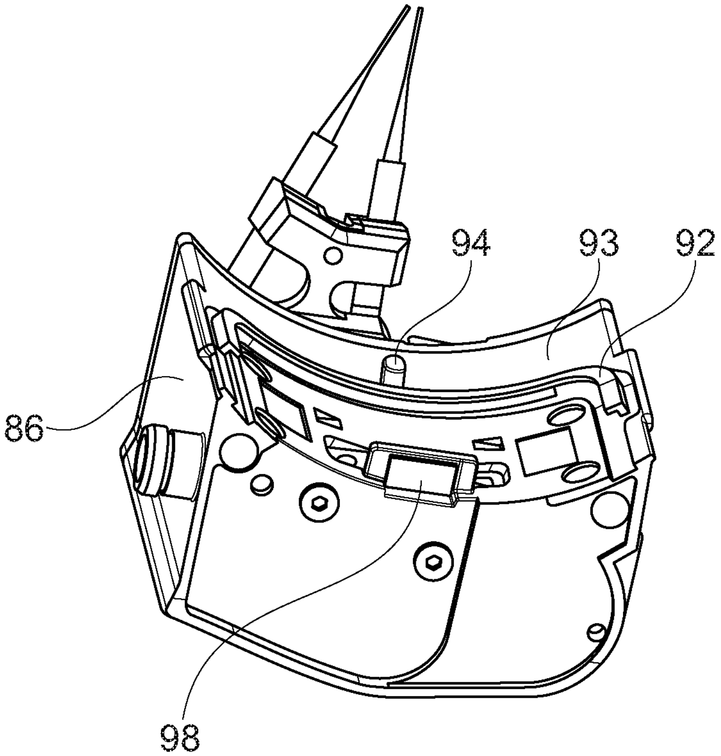

Now an add-on module, e.g. immersion set 86, can be attached to the module holder 42, wherein it is inserted with a hooking movement according to the arrow shown in FIG. 22. Additional anchoring can be provided, for example by screws etc. However, it is preferable to provide pairs of magnets on the immersion set and the module holder 42, which secure the immersion set 86 to the module holder 56. FIG. 24 shows a sectional view of the immersion set 86, which is attached to the module holder 42. It can be seen that the damage protection collar also functions as a hook rail 72, to which a corresponding hook-in projection 92 of the immersion set 86 is hooked. This hook-in projection 92 can be clearly seen in FIGS. 25 and 26, which show a top view of the immersion set 86 as seen from the objective (FIG. 25) or diagonally below it (FIG. 26). It can be clearly seen that the immersion set 86 has a concave inner surface 93, which is adapted to the convex outer surface 76 of the module holder 42 and rests against it. This ensures precise alignment of the add-on module to the objective axis. An alignment projection 94 engages in the elongated hole 74 and, together with the hook-in projection 92, which is U-shaped in the embodiment example shown and thus also embraces the hook rail 72 in a U-shape, ensures that the immersion set 86 is fixed to the module holder 42. In addition, magnets 96, 96*b* are provided on the concave inner side 92, which secure the immersion set 86 to the outer surface 76 of the module holder 42, which comprises either a suitable metal surface or, particularly preferably, suitable counter magnets for this purpose. In addition, a magnet can also be provided on an alignment bar 98, which engages in a corresponding pocket on the module holder 42, or the alignment bar 98 can be realized as a magnet.

In this way, the immersion set 86 can also be attached to the module holder 42 in a tool-free manner. In addition, it is possible to connect the adapter ring 42, the module adapter 36, the damage protection ring 84 and the objective 85 to each other without tools. It is ensured that add-on module contacts 100, which are provided on the add-on module, for example the immersion set 86, and are used for the electrical supply and control of the add-on module, are electrically connected to the microscope via the module contacts in the module contact block 62, the contacting pins 68, the mating contact elements 54, the contact elements 22 as well as the adapter contacts 28 and the mount contacts 20.

Embodiments of the disclosure are discussed in detail above. In describing embodiments, specific terminology is employed for the sake of clarity. However, the present disclosure is not intended to be limited to the specific terminology so selected. A person skilled in the relevant art will recognize that other equivalent parts can be employed and other methods developed without parting from the spirit and scope of the disclosure.

For purposes of interpreting the claims for the present invention, it is expressly intended that the provisions of 35 U.S.C. § 112(f) are not to be invoked unless the specific terms "means for" or "step for" are recited in the subject claim.

What is claimed is:

1. An apparatus for fastening an objective to an objective mount of a microscope and for providing a connection for an electrical add-on module for the objective, the apparatus comprising:

an adapter ring which comprises an eye to which the objective is attachable, the adapter ring being fastenable to the objective mount, wherein the adapter ring comprises a ring axis, a ring face facing the objective and further electrical adapter contacts for connection to electrical mount contacts of the objective mount and contact elements arranged on a ring edge for electrical connection to the add-on module; and a module adapter, which comprises:

a base body which is fastenable to an underside on the ring face of the adapter ring in a predetermined rotational position and has an opening so that the base body does not cover the eye when the base body is fastened to the ring face of the adapter ring;

electrical mating contact elements, which are arranged on the edge of the underside and which contact the contact elements arranged on the ring edge of the adapter ring when the base body is fastened to the ring face of the adapter ring, and a module holder for the add-on module, which is arranged on the base body extending parallel to the ring axis and does not cover the eye when the base body is fastened to the ring face, the module holder being configured on its side pointing away from the eye for holding the add-on module and comprising electrical module contacts for contacting the add-on module, which are conductively connected to the electrical mating contact elements.

2. The apparatus according to claim 1, wherein the module holder comprises a convexly curved outer surface which is at a constant radius to the center of the opening and thus, as a stop, ensures a defined position of the add-on module relative to an optical axis of the objective which coincides with the ring axis of the eye and the center of the opening.

3. The apparatus according to claim 1, wherein locking elements or screwing elements or a combination of locking elements and screwing elements are formed on the adapter ring and on the base body for securing the base body to the adapter ring.

4. The apparatus according to claim 1, wherein locking elements are formed the ring face of the of the adapter ring and the base body comprises mating locking elements wherein the locking elements and the mating locking elements are configured as pairs of locking pins and locking receptacles.

5. The apparatus according to claim 1, wherein pairs of magnets and counter magnets, which pull the module adapter onto the ring face, are arranged on mutually facing sides of the adapter ring and base body.

6. The apparatus according to claim 1, wherein a hook rail is arranged at the upper edge of the module holder and is designed for hooking in an add-on module.

7. The apparatus according to claim 6, wherein the hook rail is configured as a circumferential collar and guides immersion fluid, which is undesirably released above the module holder, away from the module contacts.

8. The apparatus according to claim 1, wherein the base body is annular and comprises a seal on its inner side, which seals towards the objective.

9. The apparatus according to claim 1, wherein the base body comprises on its outer side a mounting flange for fastening a protective ring which encircles the base body and which guides immersion fluid, which is undesirably released above the base body, away from the adapter ring.

10. The apparatus according to claim 1, wherein at least one of the following of is formed above the module holder for aligning an add-on module fastened to the module holder: a recess, a hole and a projection.

11. The apparatus according to claim 1, wherein the base body is formed as a ring which can be placed on the ring face.

12. The apparatus according to claim 9, wherein the mounting flange comprises an annular groove.

13. The apparatus according to claim 6, wherein the hook rail is U-shaped.

* * * * *